United States Patent [19]

Inoue

[11] 4,406,951
[45] Sep. 27, 1983

[54] HYDRAULIC PUMP DRIVE SYSTEM FOR AN AUTOMOTIVE VEHICLE

[75] Inventor: Naohiko Inoue, Yokohama, Japan

[73] Assignee: Nissan Motor Company, Limited, Kanagawa, Japan

[21] Appl. No.: 290,716

[22] Filed: Aug. 6, 1981

[30] Foreign Application Priority Data

Aug. 8, 1980 [JP] Japan .................. 55-112443[U]

[51] Int. Cl.³ .............................................. B62D 3/14
[52] U.S. Cl. .................................................. 307/10 R
[58] Field of Search ..................... 307/9, 10 R, 60, 51, 307/77, 100; 290/7, 10, 12, 22, 23, 28, 38, 48; 318/590, 591; 60/325; 417/410

[56] References Cited

FOREIGN PATENT DOCUMENTS 1014787 12/1965 United Kingdom .

OTHER PUBLICATIONS

Reference Data for Radio Engineers, by Howard W. Sams & Co., Inc. 1982, pp. 14-14 and 14-15.

Primary Examiner—L. T. Hix
Assistant Examiner—D. Jennings
Attorney, Agent, or Firm—Lowe, King, Price & Becker

[57] ABSTRACT

A hydraulic pump drive system for an automotive vehicle employing a starter motor to drive the hydraulic pump. The drive shaft of the starter motor is connected to the impeller of the pump, and can be engaged to the engine flywheel to start the engine. A control circuit is provided to connect the armature and the field winding or field windings of the starter in series for starting the engine and in parallel after the engine has been started. The control circuit also controls a valve in the hydraulic system which acts as a pressure-relief valve to minimize load due to the hydraulic pump on the starter motor during engine starting.

20 Claims, 7 Drawing Figures

HYDRAULIC PUMP DRIVE SYSTEM FOR AN AUTOMOTIVE VEHICLE

BACKGROUND OF THE INVENTION

1. The Field of the Invention

The present invention relates to a hydraulic pump drive system for an automotive vehicle, and more specifically to a hydraulic pump drive system such that the hydraulic pump is driven by the engine starter motor in such a manner that when the engine is started, the starter motor is used as a series-wound motor to start the engine, and after the engine has been started, the starter motor is used as a shunt-wound motor to drive the hydraulic pump.

2. Description of the Prior Art

Conventionally, as a hydraulic pump driving system used for a power steering device for an automotive vehicle, there exists an hydraulic pump driving system driven by the engine through a belt or chain. In the prior-art hydraulic pump driving system, however, since performance capable of withstanding high speeds is required and additionally a sufficient quantity of hydraulic fluid is required even during idling, the hydraulic pump is inevitably large in size. Additionally, since the starter motor is only used for starting the engine and is idle except when the engine is started, the starter motor is not used efficiently.

On the other hand, it is well-known to have a series-wound starter motor for starting the engine, and a shunt motor for driving a hydraulic pump for power steering, power brakes, and the like in an automotive vehicle. The starter motor is employed solely to turn the engine during starting, which requires a large torque but occurs rarely. On the other hand, the auxiliary shunt motor need generate only a small torque but must continue to operate, at least intermittently, after the engine has been started. These disparate operational requirements have led to prior art systems which include two separate motors, even though the starter motor is used only to start the engine.

SUMMARY OF THE INVENTION

With these problems in mind therefore, it is the primary object of the present invention to provide a hydraulic pump driving system whereby a starter motor can perform both the functions of engine starting and hydraulic pump driving in motor operation modes appropriate to each function.

To achieve the above-mentioned object, the hydraulic pump drive system according to the present invention comprises a starter motor, having a drive shaft connected to a hydraulic pump and engageable with the engine flywheel for starting, which operates as a series-wound motor during engine starting, but operates as a shunt motor to drive the hydraulic pump after the engine has been started, and a control circuit which responds to signals indicating the command for engine start-up and the state of engine or hydraulic system operation, to open and close circuits involving the field windings and armature of the starter motor in order to operate the starter motor as described above. The control circuit can also effect engagement of the starter motor drive shaft to the engine flywheel for engine start-up, and other possible functions in connection with the hydraulic system.

BRIEF DESCRIPTION OF THE DRAWINGS

The features and advantages of the hydraulic pump drive system for an automotive vehicle according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
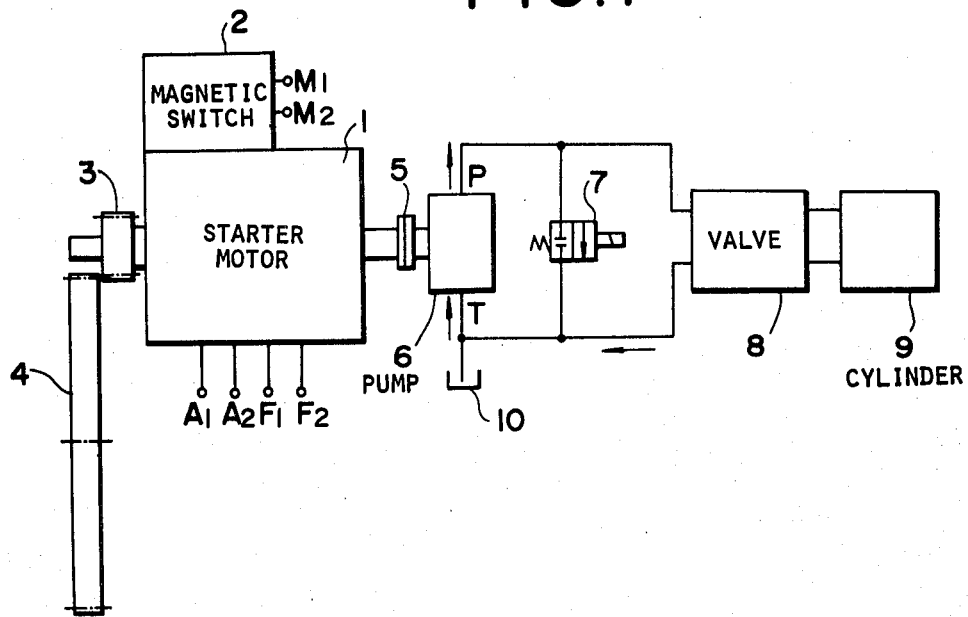
FIG. 1 is a schematic diagram illustrating the hydraulic pump drive system for an automotive vehicle according to the present invention.

FIG. 1 is a schematic diagram illustrating the hydraulic pump drive system for an automotive vehicle according to the present invention.

In the figure, the reference numeral 1 denotes a starter motor provided with terminals $F_1$ and $F_2$ for the field winding and terminals $A_1$ and $A_2$ for the armature winding. In the starting motor 1, a magnetic switch 2 is installed therein. When this magnetic switch 2 is actuated, an engagement means such as a pinion gear 3 fitted to the drive shaft of the starter motor 1 is shifted so as to engage with a flywheel 4, so that a large torque is transmitted to the engine through the flywheel 4. Numeral 5 denotes a coupling to connect the drive shaft of the starter motor to the drive shaft of the hydraulic pump. Numeral 6 denotes a hydraulic pump in which oil is pumped in through an inlet port T and is pumped out through an outlet port P. Numeral 7 denotes a magnetic valve to open or close a passageway communicating between the inlet port T and the outlet port P by energizing a solenoid provided therewithin. Numeral 8 denotes a hydraulic valve, for instance for a power steering device. Numeral 9 denotes a hydraulic cylinder and numeral 10 denotes an oil tank.

Figure 2:
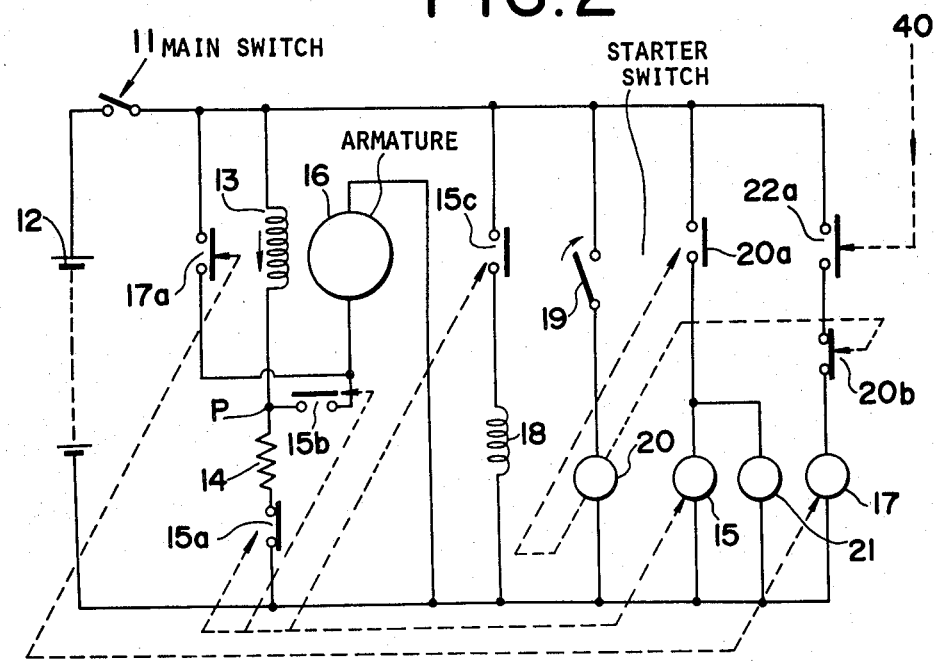
FIG. 2 is a diagram of the control circuit employed in the first preferred embodiment of the present invention.

FIG. 2 is a diagram showing a control circuit used in a first preferred embodiment of the hydraulic pump driving system according to the present invention.

In the figure, the reference numeral 11 denotes a main switch connected to a battery 12. Through the main switch 11, the first leg comprises a normally-open first contact 17a actuated by a second electromagnetic contactor 17 (described hereinafter) and an armature 16 of the starter motor 1 in series with the first contact 17a.

The second leg comprises a field winding 13 of the starter motor 1 in series with a resistor 14 and a normally-closed second contact 15a. A shunt including a normally-open third contact 15b connects a point between the first contact 17a and the armature 16 to a point between the field winding 13 and the resistor 14.

The third leg comprises a normally-open fourth contact 15c actuated by a first electromagnetic contactor 15 and a solenoid 18 of the magnetic switch 2 in series therewith.

The fourth leg comprises a first signalling means such as a starter switch 19 and a relay 20 in series therewith.

The fifth leg comprises a normally-open fifth contact 20a actuated by the relay 20, a solenoid 21 to actuate the electromagnetic valve 7, and a first electromagnetic contactor 15 connected in parallel with the solenoid 21.

The sixth leg comprises a normally-open sixth contact 22a which closes in response to a second signalling means 40, such as an external signal outputted from a power steering device, a normally-closed seventh contact 20b actuated by the relay 20, and a second electromagnetic contactor 17 in series with each other.

Hereinbelow there is explained the operation of the above-mentioned control circuit used for the hydraulic pump driving system for an automotive vehicle according to the present invention.

Figure 3:
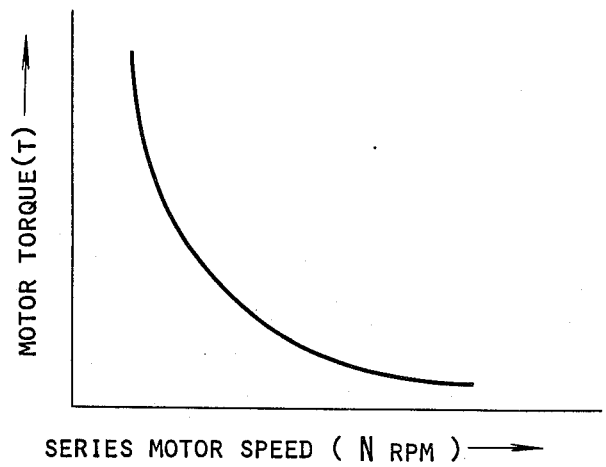
FIG. 3 is a graphical representation of the relationship between motor torque T and motor speed n (rpm) in a series-wound motor.

The first situation to be described relates to use of the starter for starting the engine. When the starter switch 19 is closed, a current is passed through the relay 20 from the battery 12 through the main switch 11 to energize the relay 20. Accordingly, the normally-open contact 20a is closed to energize the electromagnetic contactor 15 and the solenoid 21 to actuate the electromagnetic valve 7. Since the electromagnetic contactor 15 is energized, the normally-open contact 15c is closed to energize the solenoid 18 for the magnetic switch 2, so that the pinion gear 3 is shifted to mesh with the flywheel gear 4. Also, at this moment, since the normally-open contact 15b is closed and the normaly-closed contact 15a is opened, the field winding 13 is connected in series with the armature 16. Accordingly, a current is passed through the field winding and the armature to operate the starting motor as a series-wound motor. Since the characteristic curve describing the relationship between motor torque and motor speed of a series-wound motor typically resembles that shown in FIG. 3, when the motor speed is low, the motor torque is high and therefore it is possible to start the engine under a heavy load powerfully and securely. At the same time, since the solenoid 21 is energized, the electromagnetic valve 7 is also actuated or opened, to by-pass the communication between the inlet port T and the outlet port P through the hydraulic pump 6. Therefore, since no hydraulic pressure is generated between the two ports in spite of the fact that the hydraulic pump 6 is being operated, it is possible to utilize almost all of the power generated by the starter motor 1 to start the engine.

Next, when the starter switch 19 is opened, the relay 20 is deenergized to open the contact 20a. Accordingly, the electromagnetic contactor 15 and the solenoid 21 are both deenergized to open the contact 15c, so that the solenoid 18 actuating the magnetic switch 2 is opened to disengage the pinion gear 3 from the flywheel 4. Similarly, since the contact 15b is also opened, the starter motor 1 is stopped.

Figure 4:
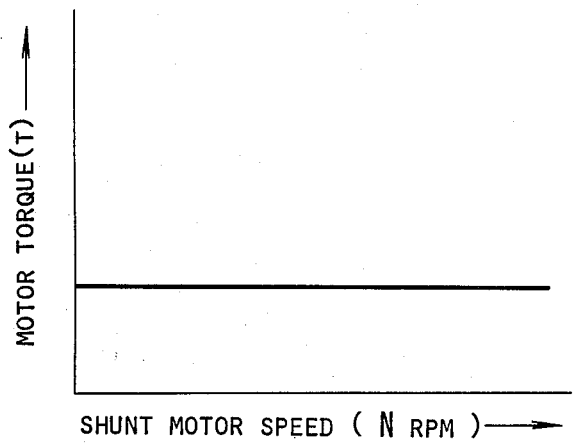
FIG. 4 is a graphical representation of the relationship between motor torque T and motor speed n (rpm) in a shunt motor.

In contrast with the above, the following description pertains to the situation where the starter motor 1 is used to operate a hydraulic pump. After the engine has been started in accordance with the procedure described above, since the starter switch 19 is opened, the relay 20 is immediately deenergized. In this state, when the normally-open contact 22a is closed by a command signal to actuate the hydraulic pump driving system, for instance by a signal generated when power steering force is detected by a sensor provided for a power steering device, a current is passed through the electromagnetic contactor 17 via the normally-closed contact 20b, so that the electromagnetic contactor 17 is energized to close the normally-open contact 17a. Further, in this case, since the electromagnetic contactor 15 is kept deenergized, the normally-open contact 15b actuated by the contactor 15 is kept open and the normally-closed contact 15a is kept closed. Accordingly, an exciting current is passed through the field winding 13 via the normally-closed contact 15a, and separate from this current path, another driving current is passed through the armature 16 via the contact 17a. Therefore, the starting motor 1 operates at a constant torque throughout the whole motor speed range. In this case, the characteristic curve describing the relationship between motor torque and motor speed of a shunt resembles that shown in FIG. 4. Further, in this case, since the magnetic switch 2 is not turned on, the pinion gear 3 does not mesh with the flywheel gear 4, so that all of the output of the starting motor 1 is used to drive the hydraulic pump 6.

Further, in this case since the solenoid 21 is deenergized, the electromagnetic valve 7 is not actuated or closed, and so the communication between the inlet port T and the output port P through the hydraulic pump 6 is not by-passed. Therefore, the hydraulic pressure from the outlet port P is applied directly to the hydraulic valve 8. The hydraulic pressure is next fed into the hydraulic cylinder 9 to obtain power, for instance to operate the power steering. Further, in the case when the voltage of the battery 12 is directly applied to the armature 16, the speed of the step motor is unconditionally determined according to the current of magnetic field.

To describe the operation briefly with reference to FIG. 1:

(1) when the starter switch 19 is turned on:

the relay 20 is activated; the fifth contact 20a is closed; the first contactor 15 and the solenoid 21 are both activated; the second contact 15a is opened; the third contact 15b is closed; the fourth contact 15c is closed; the magnet 18 actuates the magnetic switch 2 to engage the gear 3 with the flywheel 4; the valve 7 is actuated to by-pass the pump 6; therefore, the field winding 13 is connected in series with the armature 16 so as to function as a series-wound motor to start the engine, while reducing the load of the hydraulic pump.

(2) when the starter switch 19 is opened and thus the sixth contact 22a (power steering switch) is closed:

the relay 20 is deactivated; the fifth contact 20a is opened; the first contactor 15 and solenoid 21 are both deactivated; the second contact 15a is closed; the third contact 15b is opened; the fourth contact 15c is opened; the magnet 18 deactuates the magnetic switch 2 to disengage the gear 3 from the flywheel 4; the valve 7 is not actuated so that the pump 6 is not by-passed; additionally, since the seventh contact is closed; the second contactor 17 is activated; the first contact 17a is closed; therefore, the field winding 13 is connected in parallel with the armature 16 so as to function as a shunt motor to operate the hydraulic pump 6, while applying load thereto.

Figure 5:
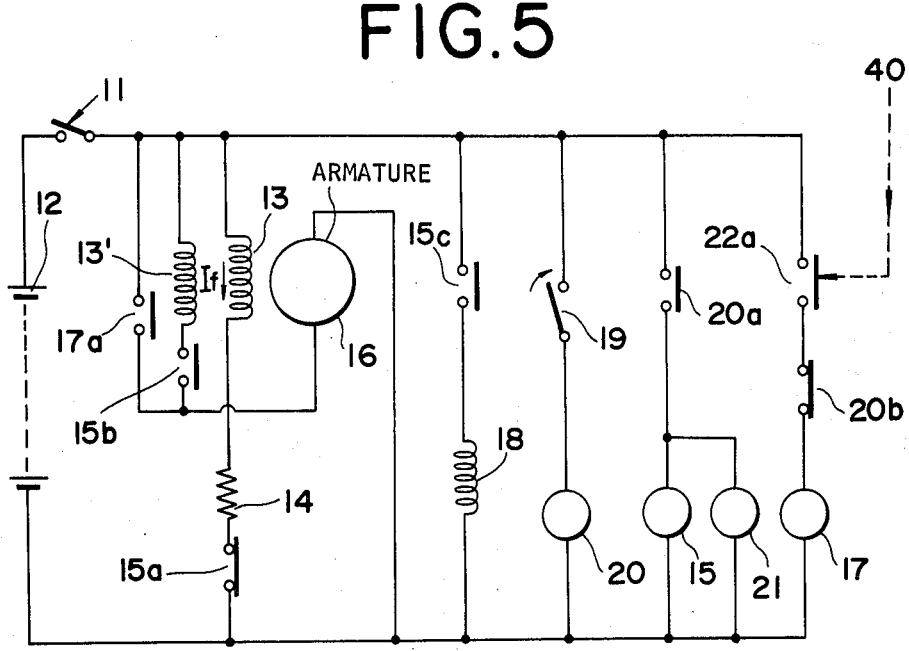
FIG. 5 is a diagram of one arrangement of the control circuit employed in the second preferred embodiment of the invention.

FIG. 5 shows a second embodiment of the hydraulic pump driving system used for an automotive vehicle according to the present invention.

As shown in FIG. 5, in this embodiment, the starter motor 1 is provided with a first and a second field windings 13 and 13'. Since the first field winding 13 is connected in series with a resistor 14 and a normally-closed contact 15a, a current is passed therethrough when the starter switch 19 is opened after the engine has been started, because the contact 15a is kept closed.

Also, since the second field winding 13' is connected in series with a normally-open contact 15b and an armature 16, a current is passed therethrough, so as to drive the starter motor 1 as a series-wound motor, when the starter switch 19 is closed to start the engine, that is, when the contact 15b is closed by the contactor 15.

Since a normally-open contact 17a is connected in series with the armature 16, when the normally-open contact 22a is closed, that is, when the contact 17a is closed by the contactor 17 after the engine has been started, the starter motor is used as a shunt motor because a current is passed through the second field winding 13' at all times.

To describe the operation briefly with reference to FIG. 1:

(1) when the starting switch 19 is turned on:
the relay 20 is activated; the fifth contact 20a is closed; the first contactor 15 and solenoid 21 are both activated; the second contact 15a is opened; the third contact 15b is closed; the fourth contact 15c is closed; the magnet 18 actuates the magnet switch 2 to engage the gear 3 with the flywheel 4; the valve 7 is actuated to by-pass the pump 6; therefore, the field winding 13 is connected in series with the armature 16 so as to function as a series-wound motor to start the engine, while reducing the load of the hydraulic pump.

(2) when the starting switch 19 is turned off and the sixth contact 22a (power steering switch) is closed:
the relay 20 is deactivated; the fifth contact 20a is opened; the first contactor 15 and solenoid 21 are both deactivated; the second contact 15a is closed; the third contact 15b is opened; the fourth contact 15c is opened; the magnet 18 deactuates the magnetic switch 2 to disengage the gear 3 from the flywheel 4; the valve 7 is not actuated so that the pump 6 is not by-passed; additionally, since the seventh contact is closed; the second contactor 17 is activated; the first contact 17a is closed; therefore, the first field winding 13 is connected in parallel with the armature 16 by-passing the second field winding 13' so as to function as a shunt motor to operate the hydraulic pump 6, while applying the load thereto. That is to say, the difference from the first embodiment being that the first field winding 13 is used only when the starter motor functions as a shunt motor, and the second field winding 13' is used only when the starter motor functions as a series motor, so that it is possible to design the desirable number of windings for each case.

In the second embodiment according to the present invention, it is possible to reduce the current required to drive the hydraulic pump 6 by increasing the number of windings of the first field winding 13 beyond that of the second field winding 13'. Additionally, in this embodiment, since a current is always being passed through the first field coil 13 after the engine has been started, it is possible to prevent a delay in rise time due to the inductance of the magnetic field produced by the first field winding 13, after the normally-open contact 22a has been closed.

Figure 6:
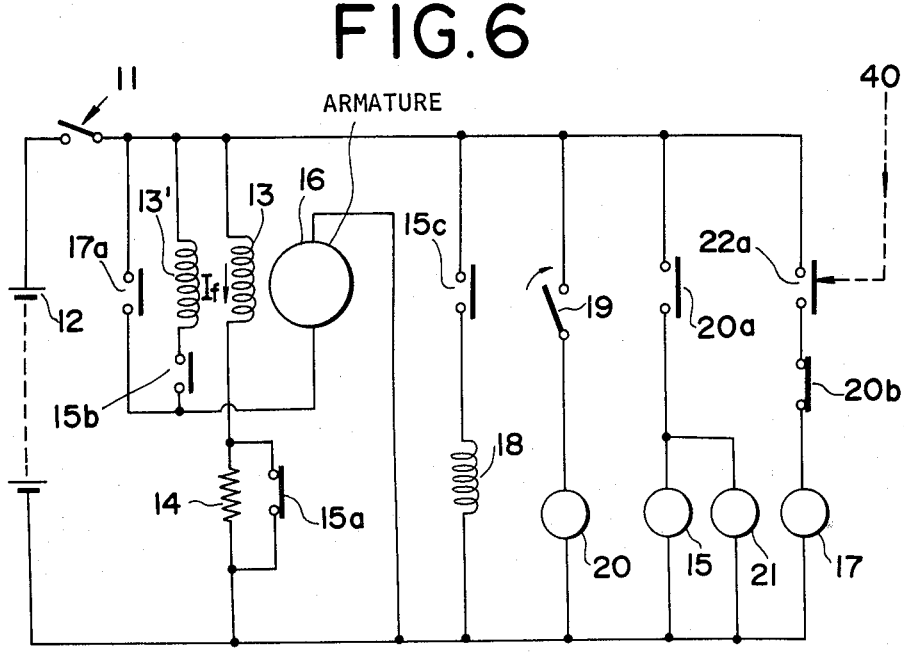
FIG. 6 is a diagram of another arrangement of the control circuit employed in the third preferred embodiment of the invention.

FIG. 6 shows a third embodiment of the hydraulic pump driving system used for an automotive vehicle according to the present invention.

The feature is this embodiment is that two field windings 13 and 13' are provided for the starter motor 1 in the same way as in the second embodiment and a current is additionally passed through the field winding 13 when the engine is started; that is, the starter motor 1 is used as a cumulative compound motor by passing the respective currents through the two field windings 13 and 13'. In this case, when the engine is started, the contact 15a is opened and the contact 15b is closed.

In order to use the starter motor 1 as a cumulative compound motor, it is preferable to arrange for the number of windings of the coil 13' to be from one-fourth to three-fourths of those used in the first or second embodiments. In practice, however, it is desirable to arrange for the number of windings of the coil 13' to be roughly a half of those used in the first or second embodiments, and the number of windings of the coil 13 to be enough to drive the hydraulic pump 6.

As shown in FIG. 6, the only difference in circuit configuration between the second embodiment shown in FIG. 5 and the third embodiment is that a normally-closed contact 15a is connected in parallel with the resistor 14, so that a current is passed through the coil 13 by way of the resistor 14 when the engine is started and by way of the normally-closed contact 15a after the engine has been started, in order to increase the current passed through the coil 13 of the starter motor driven as a shunt motor after the engine has been started.

In this embodiment, since a current is passed through the coil 13 when the engine is started to use the starter motor 1 as a cumulative compound motor, it is possible to decrease the number of windings of the coil 13', that is, to realize a light-weight, small-sized starter motor.

Figure 7:
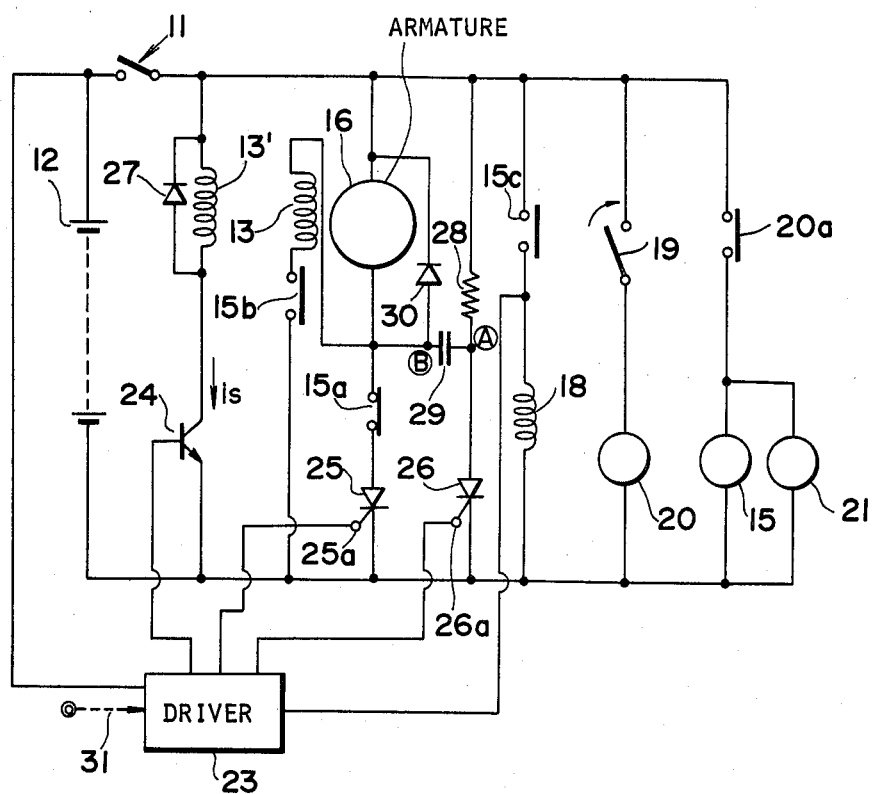
FIG. 7 is a diagram of the control circuit employed in the fourth preferred embodiment.

FIG. 7 shows a fourth embodiment according to the present invention.

In this embodiment, in place of the sixth leg made up of the normally-open contact 22a, the normally-closed contact 20b, and the solenoid 17 shown in FIGS. 2, 5 and 6, a driver circuit 23 is additionally provided to drive a transistor 24 and two thyristors 25 and 26 explained hereinafter. Further, two field coils 13 and 13' are provided for the starter motor 1.

As shown in FIG. 7, the current passed through the coil 13' is so designed as to be determined by a transistor 24 operated according to a base voltage applied from the driver 23. Further, in this embodiment, a diode 27 connected in parallel with the coil 13' is used as a surge absorber. One terminal of the coil 13 is connected to the main switch 11 through the armature 16 and the other end thereof is connected to the battery 12 through a normally-open contact 15b.

The armature 16 is connected between the main switch 11 and the battery 12 via the thyristor 25 and the contact 15a.

The reference numeral 26 denotes another thyristor to turn off the thyristor 25 by applying a reverse voltage thereto, being connected between the main switch 11 and the battery 12 through a resistor 28. Further, a condenser 29 is connected between a point (A) between the thyristor 26 and the resistor 28 and another point (B) between one end of the armature 16 and the normally-closed contact 15a. In addition, the numeral 30 denotes a diode connected across the armature 16 to absorb the counter electromotive force generated when the starter motor 1 is being idled.

The structure of the control circuit as employed in the fourth preferred embodiment differs from that used in the first three embodiments. The control circuit comprises six legs connected in parallel with one another, and a circuit driver 23 providing bias voltages to certain elements of the six legs.

The first leg comprises the second field winding 13' in series with a transistor 24 with its base connected to the circuit driver 23. In addition, a diode 27 can be provided in parallel with the second field winding 13' to protect it against voltage surges.

The second leg comprises the armature 16 connected in series with each of three sublegs connected in parallel with one another. The first subleg comprises the first field winding 13 in series with a normally-open switch 15b. The second subleg comprises a normally-closed switch 15a in series with a first thyristor 25 with its gate 25a connected to the circuit driver 23. The third subleg comprises a condensor 29 in series with a second thyristor 26 with its gate 26a connected to the circuit driver 23. In addition, a diode 30 can be provided in parallel with the armature 16 to protect it against voltage surges.

The third leg comprises a resistor 28. One end of the third leg is connected in parallel with the other five legs, and the other end is connected to a point between the condensor 29 and the second thyristor 26 to act as a resistive shunt.

The fourth leg comprises a normally-open switch 15c in series with the solenoid 18.

The fifth leg comprises the starting switch 19 in series with the relay 20.

The sixth leg comprises a normally-open switch 20a in series with each of the first contactor 15 and the solenoid 21 connected in parallel with one another.

Now, there is described the operation of this embodiment configured as described above. When the engine is started, since the starter switch 19 is closed, the relay 20 is energized and therefore the contact 20a is closed. That is, the solenoid 15 is actuated; the normally-closed contact 15a opens; the normally-opened contact 15b closes, so that a series circuit is formed from the switch 11, through the armature 16 and the coil 13, to the normally-open contact 15b.

Further, at the same time since the normally-open contact 15c is closed, the magnetic switch 2 is actuated by the solenoid 18; a voltage signal from the battery 12 is applied to the driver 23; the driver 23 applies a base voltage to the transistor 24 to pass a current is, so that a current is passed through the coil 13'.

Accordingly, currents are passed through the coils 13 and 13', when the above-mentioned series circuit and the transistor 24 are turned on, in order to drive the starter motor 1 as a cumulative compound motor.

On the other hand, after the engine has been started, the starter switch 19 is opened; the relay 20 is deenergized; the contact 20a is opened; the battery voltage signal is not applied to the driver 23 through the contact 15c, and the driver 23 sends a base voltage which allows the transistor 24 to pass a current ip greater than the above-mentioned current is. At this moment, since the normally-closed contact 15a is also closed and the normally-open contact 15b is opened, a current ip is passed through only the coil 13'. Therefore, when an external signal 31 is applied to the driver 23 from the power steering device, the driver 23 applies a voltage to the gate 25a of the thyristor 25 to fire it and a current is passed through the armature 16 to drive the hydraulic pump 6 with the starter motor 1 used as a shunt motor.

When the external signal 31 applied to the driver 23 from the power steering device is not developed, the driver 23 applies a voltage high enough to fire the thyristor 26 through the gate 26a of the thyristor 26.

Before the thyristor 26 is turned on, although the condenser 29 is charged through the resistor 28, the firing of the thyristor 26 allows the condenser 29 to discharge. As a result, a reverse voltage is applied to the thyristor 25 to turn off the thyristor 25 which is kept turned on after the voltage has been applied to the gate 25a thereof. When the thyristor 25 is turned off, no current is passed through the armature 16 and the hydraulic pump 6 is stopped.

Further, in this embodiment, although the thyristor 26 is kept turned on, since the resistance of the resistor 28 is predetermined to be large, the current flowing therethrough is so small that there arises no problem with current consumption. When the external signal 31 from the power steering device is applied to the driver 23 again, since the condenser 29 is charged into a positive polarity on the side to which the thyristor 25 is connected, as soon as the thyristor 25 is fired as described above, a reverse voltage is applied to the thyristor 26 to turn it off. In the manner described above, the current passed through the armature 16 is intermittently controlled whenever the external signal is inputted from the power steering device.

In a hydraulic pump driving system used for an automotive vehicle according to the present invention, since the starter motor 1 is driven as a cumulative compound motor by the operations of the normally-closed contact 15a, and the normally-open contacts 15b and 15c when the engine is started and since the starter motor 1 is driven as a shunt motor by the operations of the thyristors 25 and 26 when the starter motor is operated at a markedly higher frequency, for instance, such as in the case where the external signal is applied from the power steering device after the engine has been started, it is possible to realize a higher response in switching operation, a system having no mechanical contacts, and a higher reliability.

As described hereinabove, in the hydraulic pump driving system for an automotive vehicle according to the present invention, it is possible to use the starter motor as a series-wound motor for engine starting by connecting the hydraulic pump to the starter motor and to use the starter motor as a shunt motor after the engine has been started by feeding the pressurized fluid through the hydraulic pump, so that the hydraulic pump system is available for the power steering device or the brake booster.

The hydraulic pump according to the present invention is operated at a constant speed, and it is possible to obtain a large enough quantity of hydraulic fluid at idling even when a small sized hydraulic pump is used. In addition, since the hydraulic pump is driven, if necessary, irrespective of the speed of the engine, it is possible to economize on energy by operating the hydraulic pump only when necessary. As described above, the point of the present inventionn is that the starter motor is used as a motor to drive the hydraulic pump, so that it is possible to use the starter motor efficiently which is normally not used except when the engine is started.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A hydraulic pump drive system for an automotive vehicle, which comprises:
   (a) a hydraulic pump for generating hydraulic fluid pressure having an inlet duct and an outlet duct;
   (b) first signalling means for signalling when the engine of said vehicle is to be started;
   (c) second signalling means for signalling when the hydraulic pump is to be operated;
   (d) a starter motor having a drive shaft connected to said hydraulic pump so as to drive said hydraulic pump and having an armature and a field winding;
   (e) engagement means for engaging the drive shaft of said starter motor with the engine;
   (f) a control circuit responsive to said first signalling means and to said second signalling means for connecting the armature and the field winding of said starter motor in series and activating said engagement means when said first signalling means signals that the engine is to be started, and for connecting the armature and the field winding of said starter motor in parallel and deactivating said engagement means when said first signalling means does not signal that the engine is to be started and said second signalling means signals that said hydraulic pump is to be operated, whereby said starter motor functions as a series-wound motor to start the engine, and said starter motor functions as a shunt motor to drive said hydraulic pump after the engine has been started.

2. A hydraulic pump drive system for an automotive vehicle as set forth in claim 1, which further comprises a valve disposed communicating between the inlet and outlet ducts of said hydraulic pump, said valve being opened when said first signalling means signals that the engine is to be started, so that the load on said hydraulic pump becomes so small as to be negligible.

3. A hydraulic pump drive system for an automotive vehicle as set forth in claim 1, wherein said control circuit comprises:
   (a) a battery;
   (b) a first leg connected in parallel with said battery, said first leg comprising a first contact and the armature of said starter motor connected in series with one another, the first contact being kept open usually and being closed only when said second signalling means signals that said hydraulic pump is to be operated;
   (c) a second leg connected in parallel with said leg, said second leg comprising the first field winding of said starter motor, a resistor and a second contact in series with one another, the second contact being kept closed usually and being opened when said first signalling means signals that the engine is to be started;
   (d) a shunt circuit from a point on said first leg between the first contact and the armature and a point on said second leg between the field winding and the resistor, said shunt circuit including a third contact being kept open usually and being closed when said first signalling means signals that the engine is to be started;
   (e) a third leg connected in parallel with said first and second legs, said third leg comprising a fourth contact and a solenoid, in series with each other, for actuating said engagement means to engage the drive shaft with the engine when the engine is to be started, said fourth contact being kept open usually and being closed when said first signalling means signals that the engine is to be started;
   (f) a fourth leg connected in parallel with said first, second, third and fourth legs, said fourth leg comprising said first signalling means for signalling when the engine is to be started and a relay in series with each other;
   (g) a fifth leg connected in parallel with said first, second, third, and fourth legs, said fifth leg comprising a fifth contact, a first contactor and a solenoid, the contact connected in series with the combination of the contactor and the solenoid connected in parallel with each other, the fifth contact being kept open usually and being closed in response to the activation of the relay when said first signalling means signals that the engine is to be started, the first contactor activating its respective contacts and the solenoid activating said valve to reduce the load of said hydraulic pump, when the first signalling means signals; and
   (h) a sixth leg connected in parallel with said first, second, third, fourth and fifth legs, said sixth leg comprising a sixth contact, a seventh contact and a second contactor in series with one another, the sixth contact being kept open usually and being closed when said second signalling means signals that said hydraulic pump is to be operated, the seventh contact being kept closed usually and being opened by the relay when said first signalling means signals that the engine is to be started, the second contactor closing the first contact when said second signalling means signals that said hydraulic pump is to be operated, whereby said starter motor functions as a series motor to start the engine, and said starter motor functions as a shunt motor to drive said hydraulic pump after the engine has been started.

4. A hydraulic pump drive system for an automotive vehicle as set forth in claim 1, wherein said control circuit comprises:
   (a) a battery;
   (b) a first leg connected in parallel with said battery said first leg comprising a first contact and the armature of said starter motor connected in series with one another, the first contact being kept open usually and being closed only when said second signalling means signals that said hydraulic pump is to be operated;
   (c) a second leg connected in parallel with said leg, said second leg comprising the first field winding of said starter motor, a resistor and a second contact in series with one another, the second contact being kept closed usually and being opened when said first signalling means signals that the engine is to be started;
   (d) a shunt circuit from a point on said first leg between the first contact and the armature and said battery; said shunt circuit including a third contact and a second field winding in series with each other, the third contact being kept open usually and being closed when said first signalling means signals that the engine is to be started;
   (e) a third leg connected in parallel with said first and second legs, said third leg comprising a fourth contact and a solenoid, in series with each other, for actuating said engagement means to engage the drive shaft with the engine when the engine is to be started, said fourth contact being kept open usually and being closed when said first signalling means signals that the engine is to be started;

(f) a fourth leg connected in parallel with said first, second, third and fourth legs, said fourth leg comprising said first signalling means for signalling when the engine is to be started and a relay in series with each other;

(g) a fifth leg connected in parallel with said first, second, third, and fourth legs, said fifth leg comprising a fifth contact, a first contactor and a solenoid, the contact connected in series with the combination of the contactor and the solenoid connected in parallel with each other, the fifth contact being kept open usually and being closed in response to the activation of the relay when said first signalling means signals that the engine is to be started, the first contactor activating its respective contacts and the solenoid activating said valve to reduce the load of said hydraulic pump, when the first signalling means signals; and (h) a sixth leg connected in parallel with said first, second, third, fourth and fifth legs, said sixth leg comprising a sixth contact, a seventh contact and a second contactor in series with one another, the sixth contact being kept open usually and being closed when said second signalling means signals that said hydraulic pump is to be operated, the seventh contact being kept closed usually and being opened by the relay when said first signalling means signals that the engine is to be started, the second contactor closing the first contact when said second signalling means signals that said hydraulic pump is to be operated, whereby the first mentioned field winding is used only when the starter motor functions as a shunt motor, and the second field winding is used only when the starting motor functions as a series motor.

5. A hydraulic pump drive system for an automotive vehicle as set forth in claim 4, wherein said second leg connected in parallel with said first leg comprises the first mentioned field winding of said starter motor, a resistor and a second contact, the second contact being connected in parallel with the resistor connected in series with the first mentioned field winding, the second contact being kept closed usually and being opened when said first signalling means signals that the engine is to be started, whereby said starter motor is used as a cumulative compound motor, when the engine is to be started, by passing a current through the first field winding.

6. A hydraulic pump drive system for an automotive vehicle according to claim 1, wherein said control circuit comprises:

(a) a first leg comprising a second field winding of said starter motor and a transistor in series;

(b) a second leg, connected in parallel with said first leg, comprising the armature of said starter motor in series with each of three sublegs, the first subleg comprising the first mentioned field winding in series with a first contact, which closes the circuit when the first signalling means signals that the engine is to be started, the second subleg being connected in parallel with the first subleg and comprising a second contact, which opens the circuit when said first signalling means signals that the engine is to be started, in series with a first thyristor, and the third subleg being connected in parallel with the first and second sublegs and comprising a condenser;

(c) a third leg, connected in parallel with said first and second legs, comprising a resistor in series with a second thyristor, and being connected with the condenser of the third subleg of said second leg in such a way that the condenser is connected between the armature of said starter motor and a point between the resistor and the second thyristor;

(d) a fourth leg, connected in parallel with said first, second, and third legs, comprising a third contact, which closes the circuit when said first signalling means signals that the engine is to be started, in series with a solenoid for operating said engagement means when the third contact closes the circuit; and (e) a fifth leg connected in parallel with said first, second, third and fourth legs, said fifth leg comprising and first signalling means for signalling when said engine is to be started and a relay in series with each other;

(f) a sixth leg connected in parallel with said first, second, third, fourth, and fifth legs, said sixth leg comprising a fourth contact, a first contactor and a solenoid, the fourth contact connected in series with the combination of the contactor and the solenoid connected in parallel with each other, the fourth contact being kept open usually and being closed in response to the activation of the relay when said first signalling means signals that the engine is to be started, the fourth contact activating the respective contacts and the solenoid activating said valve to reduce the load of said hydraulic pump, when the first signalling means signals;

(g) a circuit driver responsive to said first and second signalling means for providing bias voltages to the transistor and the first and second thyristors as follows:

(1) when said first signalling means signals that the engine is to be started, said circuit driver applies a bias boltage to the base of the transistor so that the transistor permits conduction of a current of magnitude is through said first leg of said control circuit; in the opposite case, said circuit driver applies a bias voltage to the base of the transistor so that the transistor permits conduction of a current ip greater in magnitude than the current is;

(2) when said second signalling means signals that said hydraulic pump is to be operated, said circuit driver applies to the gate of the first thyristor a bias voltage sufficient to fire the first thyristor, thus closing the circuit of the second subleg of said second leg;

(3) when said second signalling means signals that said hydraulic pump is not be operated, said circuit driver applies to the gate of the second thyristor a bias voltage sufficient to fire the second thyristor, thus discharging the condenser, which in turn causes a reverse voltage on the first thyristor, causing the first thyristor to open the circuit of the second subleg of said second leg;

whereby when the engine is to be started, the second field winding is connected in parallel with the armature of said starter motor with a limited current is and the first mentioned field winding is connected in series with the armature so that said starter motor functions as a cumulative compound motor, and after the engine has been started, when said hydraulic pump is to be operated a parallel circuit including the first field winding and the armature is closed so that said starter motor is turned on to function as a shunt motor, and when said hydraulic pump is not to be operated all circuits including the armature of said starter motor are opened so that said starter motor is turned off.

7. A hydraulic pump drive system for an automotive vehicle as set forth in claim 6, wherein said first leg of said control circuit further comprises a diode connected in parallel with the second field winding, and said second leg of said control circuit further comprises a diode connected in parallel with the armature, whereby the second field winding and the armature are protected from damage due to sudden large changes in voltage.

8. A hydraulic pump drive system for an automotive vehicle as set forth in claim 1 wherein said first signalling means is an engine starter switch.

9. A hydraulic pump drive system for an automotive vehicle as set forth in claim 1 wherein said second signalling means is a power steering switch which generates a signal when the power steering device is required to be operated.

10. A hydraulic pump drive system for an automotive vehicle as set forth in claim 1 wherein said second signalling means is a hydraulic fluid pressure sensor.

11. A hydraulic pump drive system for an automotive vehicle as set forth in claim 1, wherein said engagement means is a pinion gear slidably attached to the drive shaft of said starter motor such that said pinion gear can be moved from a position fully disengaged from an engine flywheel to a fully-engaged position and transmits torque from the drive shaft of said starter motor to the engine flywheel when the pinion gear is in the fully engaged position.

12. A method of driving a hydraulic pump, which comprises the steps of:
(1) signalling when an engine is to be started;
(2) engaging a drive shaft of a starter motor with a drive shaft of the engine;
(3) connecting a field winding of the starter motor in series with an armature thereof so that the starter motor functions as a series motor to start the engine;
(4) signalling when a hydraulic pump is to be operated;
(5) disengaging the drive shaft of the starter motor from the drive shaft of the engine; and
(6) connecting the field winding of the starter motor in parallel with the armature thereof so that the starter motor functions as a shunt motor to drive said hydraulic pump after the engine has been started.

13. A method of driving a hydraulic pump, which comprises the steps of:
(1) signalling when an engine is to be started;
(2) engaging a drive shaft of a starter motor with a drive shaft of the engine;
(3) connecting a first field winding of a starter motor in parallel with an armature thereof and connecting a second field winding of the starter motor in series with the armature thereof so that the starter motor functions as a cumulative compound motor to start the engine;
(4) signalling when a hydraulic pump is to be started;
(5) disengaging the drive shaft of the starter motor from the drive shaft of the engine; and
(6) connecting the first field winding of the starter motor in parallel with the armature thereof and shorting the second field winding of the starter motor so that the starter motor functions as a shunt motor to drive said hydraulic pump after the engine has been started.

14. A method of driving a hydraulic pump, as set forth in claim 12, which further comprises the steps of:
(1) connecting an inlet port and an outlet port of the hydraulic pump by the use of a valve thereby bypassing the hydraulic pump in order to reduce the load of the hydraulic pump when the engine is to be started; and
(2) disconnecting the inlet port and the outlet port of the hydraulic pump by the use of the valve when the hydraulic pump is to be operated.

15. A hydraulic pump drive system for an automotive vehicle as set forth in claim 3, wherein said first signalling means is an engine starter switch.

16. A hydraulic pump drive system for an automotive vehicle as set forth in claim 6, wherein said first signalling means is an engine starter switch.

17. A hydraulic pump drive system for an automotive vehicle as set forth in claim 3, wherein said second signalling means is a power steering switch which generates a signal when the power steering device is required to be operated.

18. A hydraulic pump drive system for an automotive vehicle as set forth in claim 6, wherein said second signalling means is a power steering switch which generates a signal when the power steering device is required to be operated.

19. A hydraulic pump system for an automotive vehicle as set forth in claim 3, wherein said second signalling means is a hydraulic fluid pressure sensor.

20. A hydraulic pump drive system for an automotive vehicle as set forth in claim 6, wherein said second signalling means is a hydraulic fluid pressure sensor.

* * * * *